(No Model.) 5 Sheets—Sheet 1.

W. TAYLOR.
ENGRAVING MACHINE.

No. 542,902. Patented July 16, 1895.

Witnesses:
G. W. Rea
J. A. Aul

Inventor:
William Taylor
By James L. Norris
Atty.

(No Model.)  5 Sheets—Sheet 2.
W. TAYLOR.
ENGRAVING MACHINE.
No. 542,902. Patented July 16, 1895.
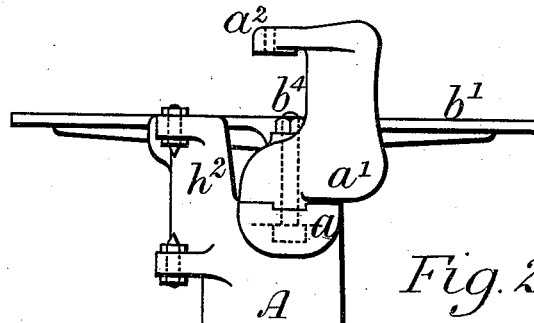
*Fig. 2.*
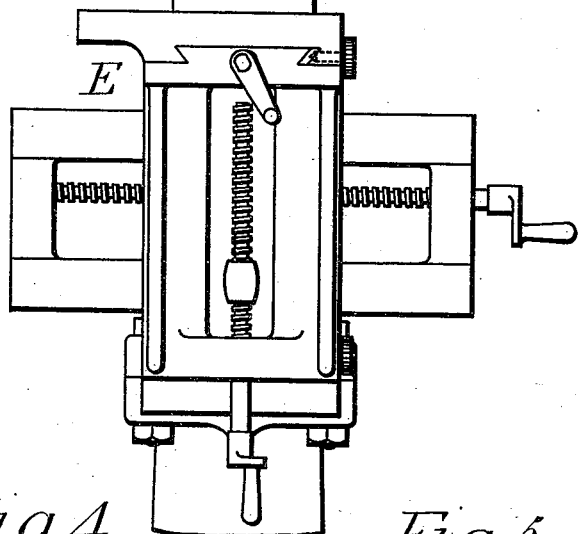
*Fig. 4.*     *Fig. 5.*
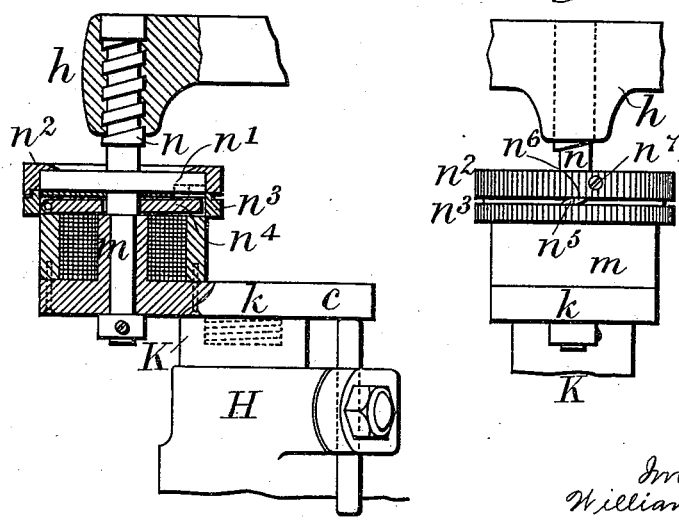
Witnesses:
G. W. Rea
J. A. Saul
Inventor:
William Taylor,
By James L. Norris,
Atty.

(No Model.)  W. TAYLOR.  5 Sheets—Sheet 3.
ENGRAVING MACHINE.
No. 542,902.  Patented July 16, 1895.
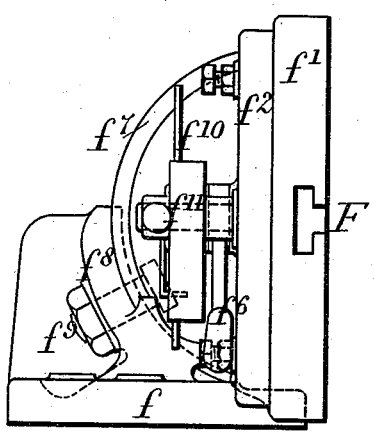
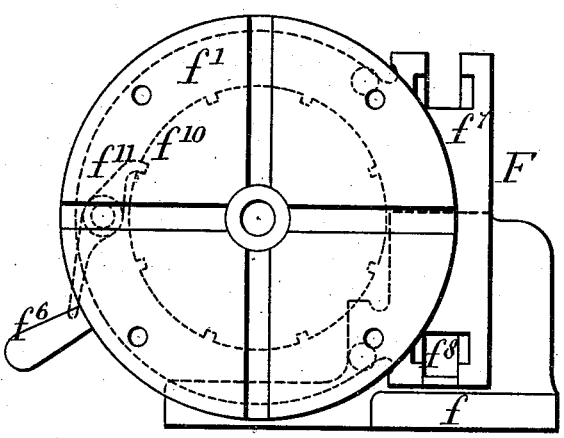
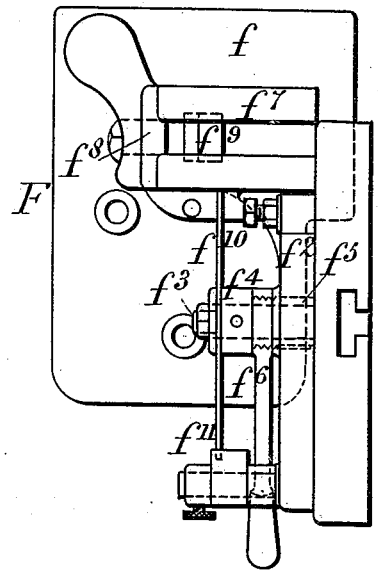
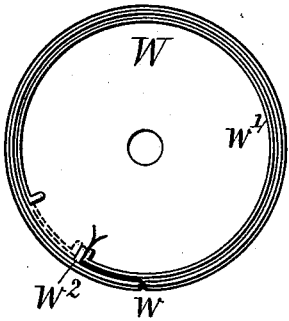
Witnesses:
G. W. Rea.
J. A. Saul
Inventor:
William Taylor,
By James L. Norris
Atty (No Model.) 5 Sheets—Sheet 4.
W. TAYLOR.
ENGRAVING MACHINE.

No. 542,902. Patented July 16, 1895.

Witnesses:
G. W. Rea,
J. A. Saul.

Inventor,
William Taylor,
By James L. Norris
Atty.

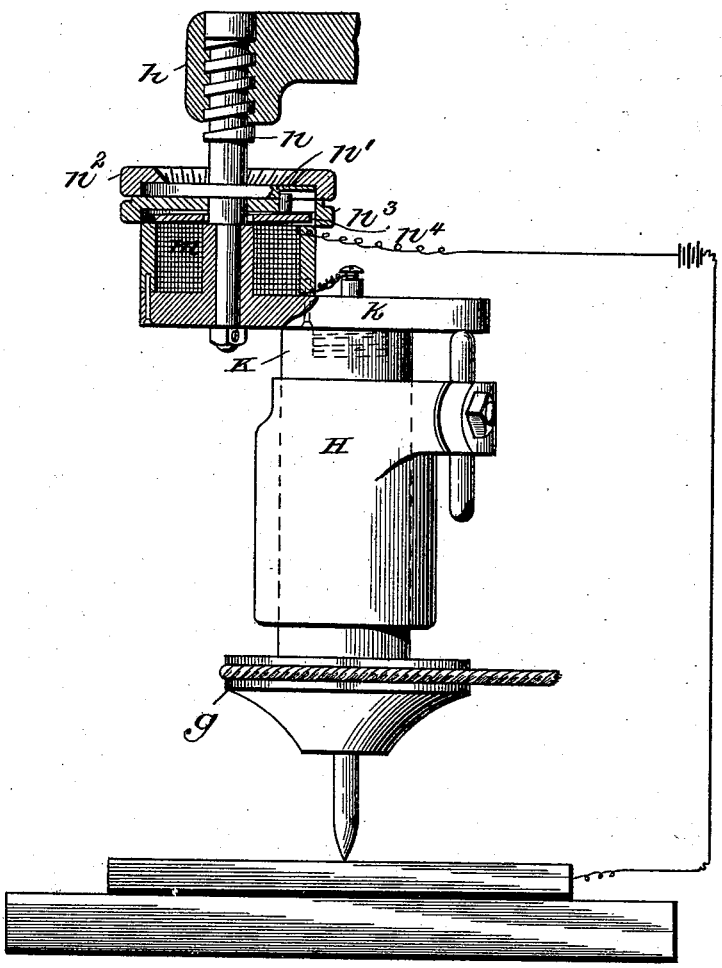

UNITED STATES PATENT OFFICE.

WILLIAM TAYLOR, OF LEICESTER, ENGLAND, ASSIGNOR OF TWO-THIRDS TO THOMAS SMITHIES TAYLOR AND HERBERT WILLIAM HOBSON, OF SAME PLACE.

ENGRAVING-MACHINE.

SPECIFICATION forming part of Letters Patent No. 542,902, dated July 16, 1895.

Application filed May 28, 1894. Serial No. 512,790. (No model.) Patented in England March 30, 1894, No. 6,420, and in Germany April 8, 1894, No. 80,915.

*To all whom it may concern:*

Be it known that I, WILLIAM TAYLOR, a citizen of England, residing at Slate Street, Leicester, county of Leicester, England, have invented certain new and useful Improvements in Engraving-Machines, (for which I have obtained Letters Patent in Great Britain, dated March 30, 1894, No. 6,420, and in Germany, dated April 8, 1894, No. 80,915,) of which the following is a specification.

This invention relates to machines in which a revolving drill guided by one arm of a pantograph engraves a copy of a design or pattern along which a tracing-point carried by another arm is guided. I shall describe these improvements, referring to the accompanying drawings.

Figure 1:
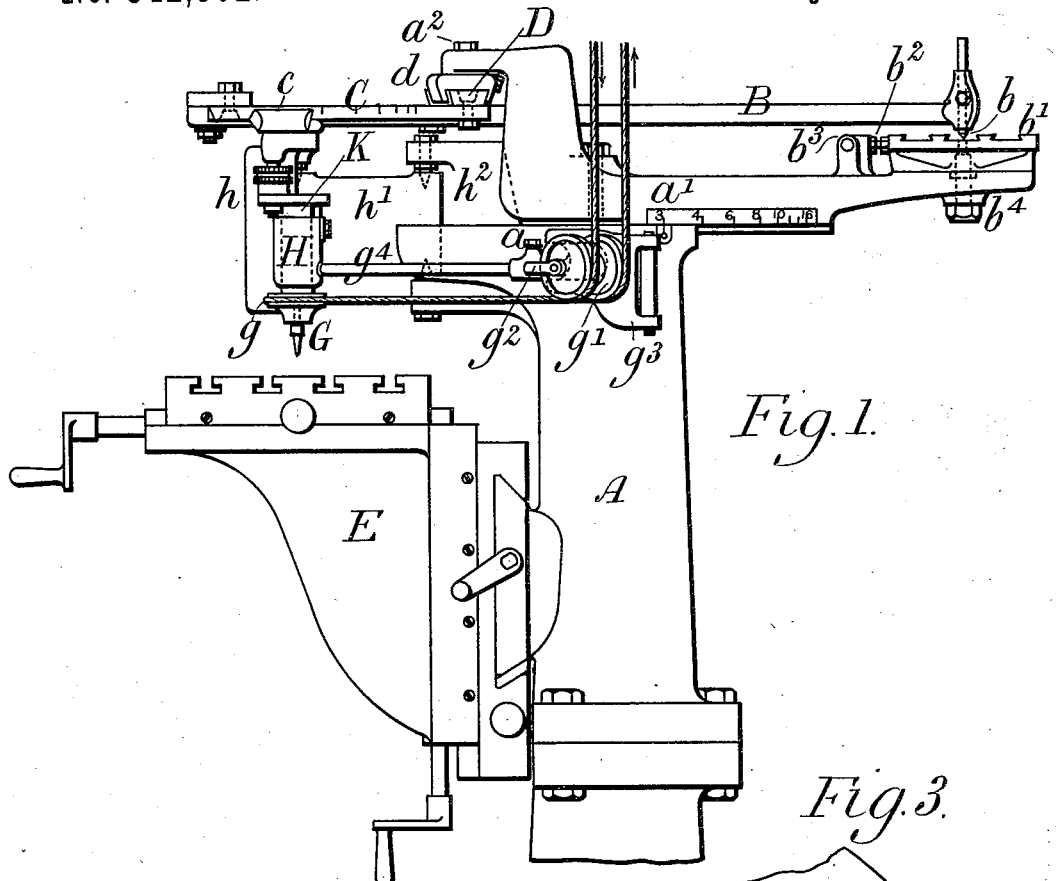
Figure 3:
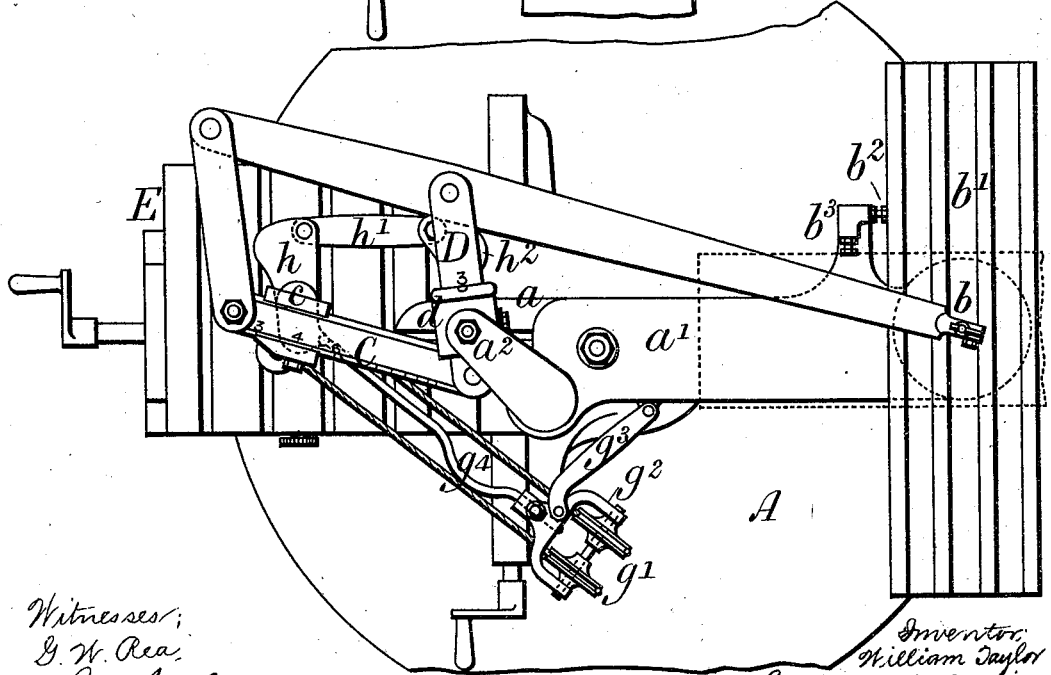
Figure 11:
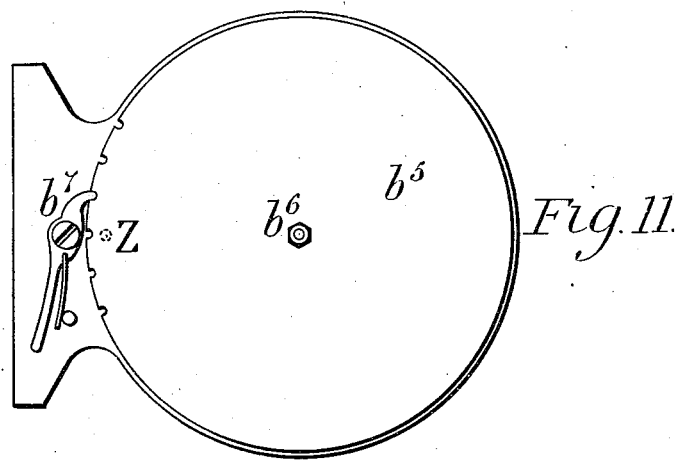
Figure 12:
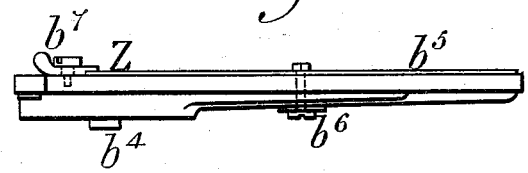
Figure 13:
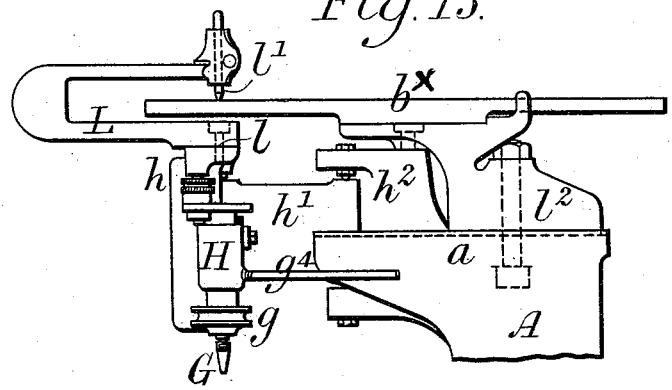

Figure 1 is a side view, Fig. 2 is an end view, and Fig. 3 is a plan of the upper part of an engraving-machine according to this invention. Figs. 4 and 5 are respectively side and end views, the side view partly in section, of the feeding-gear for the drill. Figs. 6 and 7 are respectively side and end views, and Fig. 8 is a plan of a chuck for holding cylindrical or other round objects to be engraved on. Figs. 9 and 10 are respectively a front view and a section of a gage-wheel for circular work. Figs. 11 and 12 are respectively a plan and side view of a circular table for the pattern. Fig. 13 is an elevation showing the arrangement of copying to the same scale as the pattern. Fig. 14 is a side elevation, partly in section, illustrating the electrical feed device.

On a column A of convenient height I provide a slide-bed $a$, on which I fit a slide $a'$. On this slide I pivot at $a^2$ a pantograph or parallelogram of jointed bars, one of its sides being extended as an arm B carrying the tracer $b$. The side C opposite to B carries a slide $c$, to which is connected the bearing of the drill G, and the side D, which connects the sides B and C, is fitted to slide in a guide $d$, which can turn on the pivot $a^2$. By sliding the bar D to various positions in the guide $d$, and $c$ to various positions proportionally on the bar C, the scale of the copy can be varied in the usual way, the centers of the tracer $b$, the pivot $a^2$, and of the drill being always in one straight line. The bars C and D are suitably graduated. The slide $a'$ is also graduated, and when $c$ is shifted along C and D along $d$ the slide $a'$ is also moved along $a$, so that the axis of the drill-spindle G always remains in the same position when the tracer $b$ is in the central position shown in Fig. 3.

A table $b'$, on which the pattern or design to be copied is fixed, is mounted on a pivot $b^4$, on which it can be turned one-quarter round, its movement being limited by adjustable stop-screws $b^2\ b^3$, so that it can be clamped by a nut on its pivot-bolt $b^4$, either in the position shown or in a position at right angles to it, as indicated by the dotted lines in Fig. 3. A slide-rest E, having longitudinal, transverse, and vertical movements, is fixed on the column A, and on its upper face is fixed the plate or other flat object on which the copy is to be engraved.

When the object to be engraved is of cylindrical or other round shape the chuck F (shown in Figs. 6, 7, and 8) has its base $f$ bolted onto the table of the slide-rest E. The chuck has a disk $f'$, on the face of which is fixed the object to be engraved. This disk is pivoted by a pin $f^3$ in the center of a disk $f^2$, so that it can be turned round. The pin $f^3$ has fixed on it a collar $f^4$, and through the center of $f^2$ passes a sleeve $f^5$ inclosing the pin $f^3$. This sleeve is fitted with a key, so that it can slide in $f^2$, but cannot turn. Its rear end is screw-threaded and is engaged by a nut with a handle $f^6$, by pushing down which the sleeve $f^5$ is screwed back against the collar $f^4$, thereby drawing the disk $f'$ back against the face of $f^2$, so that it is firmly clamped in position. By raising the handle $f^6$ the disk $f'$ is released and can be turned. The disk $f^2$ has integral with it a double circular segment $f^7$, which can slide along a circular segmental guide $f^8$ projecting up from the base $f$. The disk $f^2$, carrying $f'$, can be turned more or less on the horizontal axis of the guide $f^8$ and can be clamped by a nut $f^9$, the face of $f'$ being thus presented in a vertical or in a horizontal plane or at any intermediate inclination. On the pivot-pin $f^3$ is clamped by a nut a notched disk $f^{10}$, with the notches of which a spring-pawl $f^{11}$ can engage, so as to hold the disk $f'$ in various positions as it is turned round on its axis $f^3$. It is convenient to have a number of disks $f^{10}$ having various numbers of notches, any one of these being put on $f^3$ to suit the division of the circular piece fixed in $f'$ that has to be engraved.

When work has to be done for which no disk $f^{10}$ is adapted, it is convenient to employ, instead of the divided disk $f^{10}$, a gage-wheel W, such as is shown in front view in Fig. 9 and in section in Fig. 10. The rim of this wheel is slit at $w$ and has fitted within it an elastic spring-ring $w'$. A strip of paper or other flexible material can be put round the circumference of the wheel, the ends of the strip being both passed through the slit $w$, and the ring $w'$ being then turned round until its end reaches a stop at $w^2$, thus clamping the ends of the strip. This strip having been marked (with lines to be read against the edge of the pawl) for certain engraving work can be taken off the wheel W and put aside to be used again when similar work has to be executed.

When the pattern to be copied consists of letters or other designs which are to be successively brought to the zero-point for the tracer $b$, I remove this rectangular table $b'$ and fix in its place a circular table $b^5$. (Shown in plan in Fig. 11 and in elevation in Fig. 12.) It is fixed by the bolt $b^4$, so that a point $z$ upon its face coincides in position with the center of the bolt $b^4$, and therefore with the position of the tracer $b$, as shown in Fig. 3, corresponding to what may be termed the "zero position" of the drill. The circular plate $b^5$ is divided at its edge by notches engaged by a spring-pawl $b^7$, so that it can be turned round to bring successive letters or other designs round to $z$.

When the engraving has to be made to the same scale as the pattern (see Fig. 13) I remove the slide $a'$ and the pantograph, leaving the drill-bearing still carried on the arms $h\ h'$. On the top of $h$ I fix by a screw $l$ a U-shaped bracket L, which carries a tracer $l'$ adjustable in height. I also bolt on $a$, the head of the column, a stand $l^2$, on which I mount the plate $b^x$ carrying the pattern. On now moving the tracer $l'$ over the pattern, which is stationary, the drill moves with it, copying to the same scale as the pattern.

The drill-spindle G has on it a pulley $g$, round which the driving-band is led from a pair of guide-pulleys $g'$ mounted in a fork $g^2$, which is steadied by a link $g^3$, connecting it to the column A, and by a stay-rod $g^4$, connecting it to the bearing of the drill-spindle, along which rod the fork $g^2$ can be slid to tighten the band. The bearing of the drill-spindle is formed in a boss H projecting from a deep bracket $h$, which is jointed to a deep link $h'$ pivoted to an arm $h^2$ projecting up from the top of the column A. Thus, while the jointing of $h$ to $h'$ and of $h'$ to $h^2$ allows freedom of motion to the drill-spindle in the horizontal plane, the boss H is steadied against any vertical movement or oscillation.

The feed of the drill is effected in the following manner, (see Figs. 4 and 5:)

The bearing of the drill-spindle G is formed in a sleeve K, which can slide vertically in the boss H. The soft-iron collar $k$ of the sleeve K is made to form the core and shell of an electromagnet $m$. The feed-screw $n$ has integral with it a disk $n'$, which has a notch at the edge and is inclosed within a milled ring $n^2$ forming a hand-wheel. Under this is another milled hand-wheel $n^3$ having within it a disk $n^4$ jointed at its edge to $n^3$ by a spring-hinge, which usually holds $n^4$ up, so that a stud upon its opposite edge is engaged in the notch of $n'$. On the hand-wheel $n^3$ there is a stop $n^5$ projecting upward, and on the ring $n^2$ there is a stop $n^6$ projecting downward. The chamfered inner edge of the ring $n^2$ has a zero-mark, and the upper face of the disk $n'$ is graduated, and the ring $n^2$ can be turned round any desired number of the divisions, according to the desired depth of the engraving, separating more or less the stop $n^6$ from $n^5$, in which position the ring $n^2$ is clamped to the disk $n'$ by a setting-screw $n^7$. The metal to be engraved being insulated and connected by a conductor to one terminal of a battery or other source of electricity, while the coil of the magnet $m$ has its one end connected to the other terminal and its other end to metal of the machine, the operator turning the ring $n^2$ lowers the sleeve K and all carried on it until the drill touches the work, closing the circuit of the magnet $m$, which thereupon attracts its armature, the hinged disk $n^4$, stud of which is thus withdrawn from the notch of $n'$. The operator continues to screw down until the stop $n^6$ meets $n^5$, and now, as the hand-wheel $n^3$ is firmly held by the magnetic attraction on $n^4$, the drill cannot be fed farther down. Thus the depth of the engraving is determined by the number of divisions through which $n^2$ is turned.

Having thus described the nature of my invention and the best means I know for carrying the same into practical effect, I claim—

1. An engraving machine having a column carrying on its side a slide rest and at its top a bracket to which is pivoted one of two jointed arms carrying a drill spindle bearing, having also on its top an adjustable slide having pivoted on it a pattern table and adjustably pivoted on it a pantograph of which one arm carries a tracer over the pattern table, and another arm is adjustable in a slide pivoted to the drill spindle bearing, substantially as and for the purposes set forth.

2. In an engraving machine, the combination with a pantograph of the drill spindle G carried thereby, a driving pulley $g$ mounted on said spindle, a stay rod $g^4$ pivotally connected at one end to the bearing of the drill spindle, a fork $g^2$ adjustably mounted on the opposite end of said stay rod, means for locking said fork in its adjusted position on the stay rod, two guide pulleys mounted in said fork and a horizontally swinging link $g^3$ hinged at one end to said fork and at its other end to the frame of the machine, substantially as described.

3. In an engraving machine, the combination with the centrally apertured disk $f^2$ provided with a segment adjustably mounted in a segmental bearing, of the work holding disk $f'$ mounted on a spindle $f^3$ loosely passing through the apertured disk $f^2$ and provided at its rear end with a fixed collar $f^4$, a sleeve $f^5$ mounted on said spindle and freely passing through the apertured disk $f^2$ but keyed against rotation therein, and a hand-nut $f^6$ fitted over the screw-threaded end of said sleeve and operating to draw the disks $f'$ and $f^2$ together, substantially as described.

4. In an engraving machine, the combination with the chuck for holding circular work, of a gage wheel W provided upon its periphery with a slotted flange, a split annular spring arranged within said flange, a stop $W^2$ arranged upon the interior of said flange, and a flexible band encircling said flange and secured at its ends between said spring and stop, substantially as described.

5. In an engraving machine the electrical feed apparatus consisting of the sliding sleeve K carrying the drill spindle, its iron collar $k$ and coil forming an electromagnet $m$, its armature $n^4$ hinged to ring $n^3$, the feed screw $n$, its disk $n'$ and hand ring $n^2$ adjustable thereon, substantially as described.

In testimony whereof I have signed my name to this specification, in the presence of two subscribing witnesses, this 16th day of May, A. D. 1894.

WILLIAM TAYLOR.

Witnesses:
   W. A. WARDEN,
   W. H. LUCAS.